Patented Nov. 7, 1922.

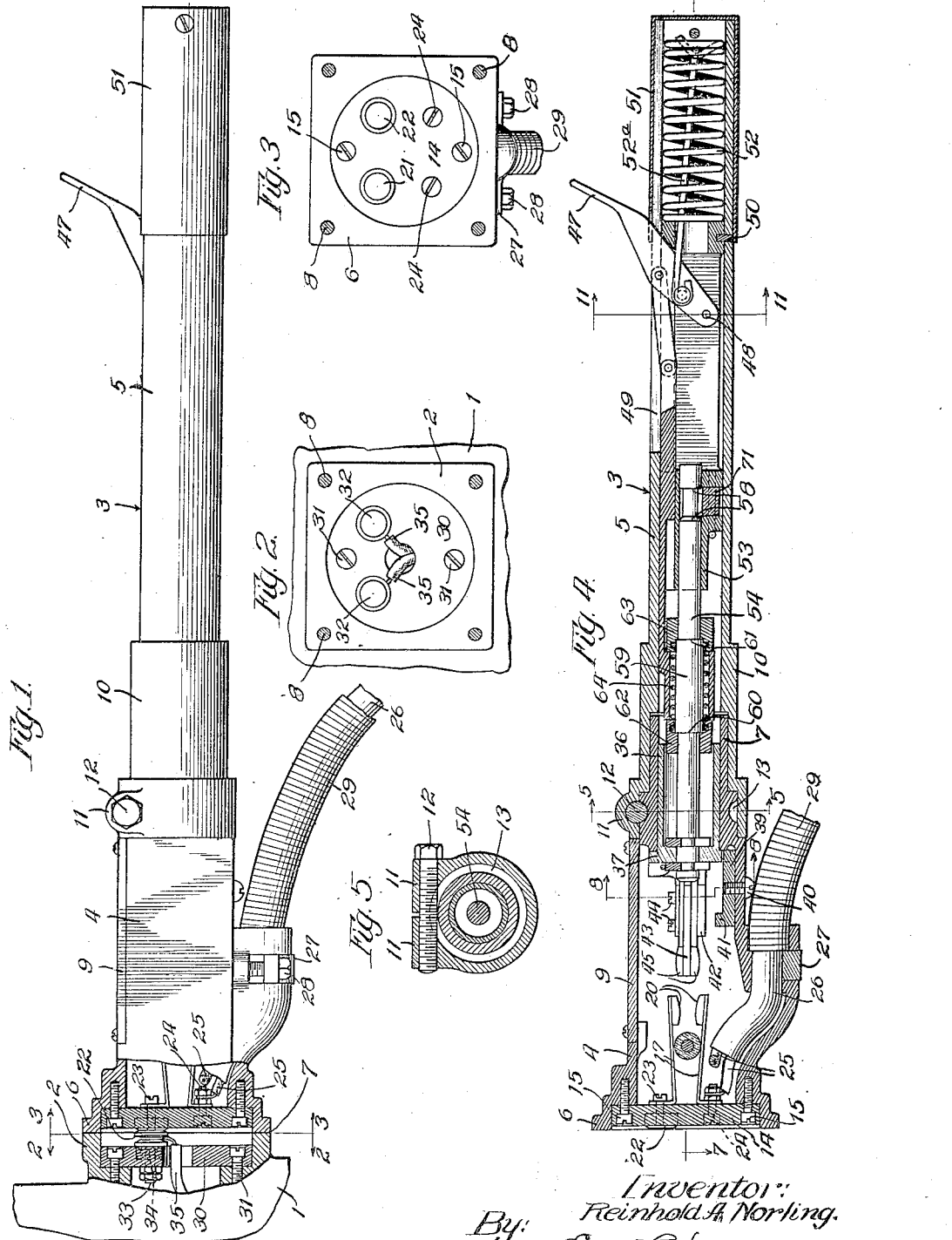
R. A. NORLING.
SWITCH HANDLE.
APPLICATION FILED MAY 28, 1920.
1,434,560.
Patented Nov. 7, 1922.
2 SHEETS—SHEET 1.
Inventor:
Reinhold A. Norling.
By Eugene Cubum Atty R. A. NORLING.
SWITCH HANDLE.
APPLICATION FILED MAY 28, 1920.
1,434,560.
Patented Nov. 7, 1922.
2 SHEETS—SHEET 2.
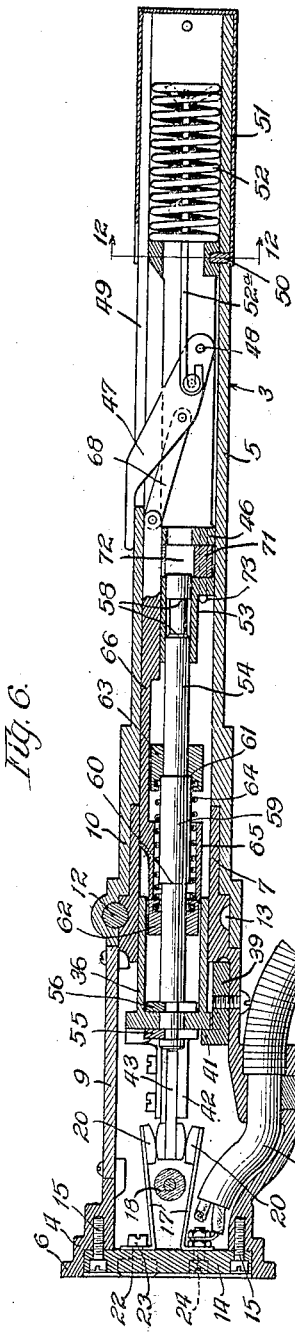
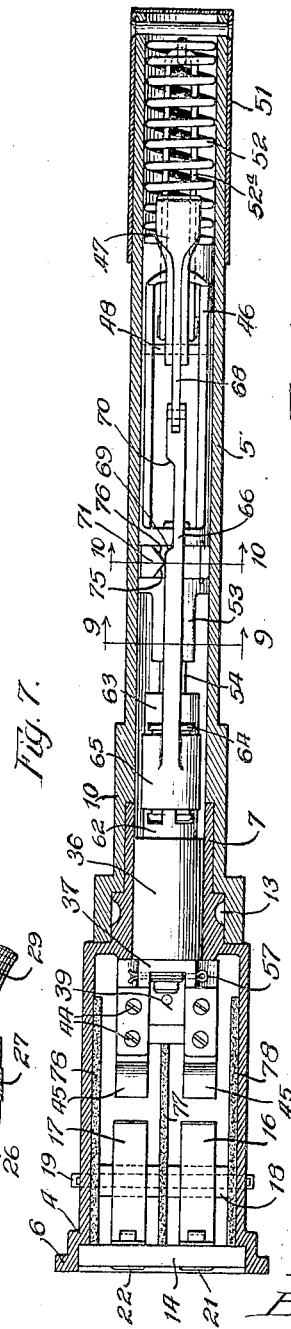
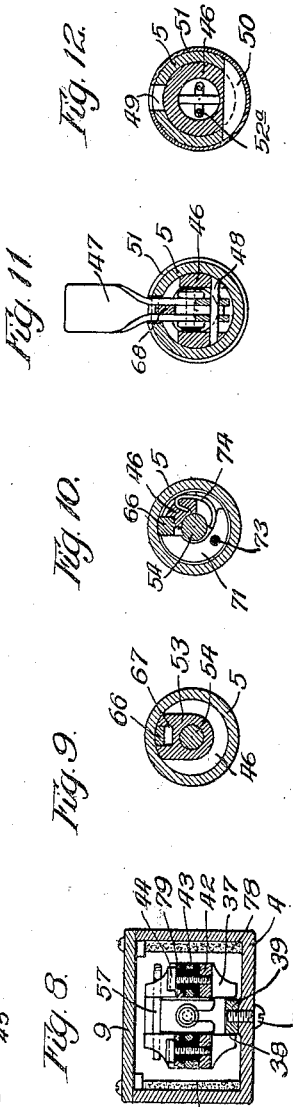
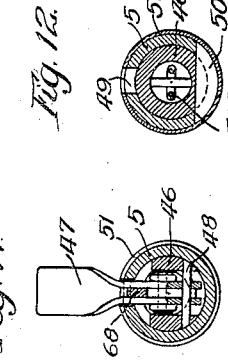
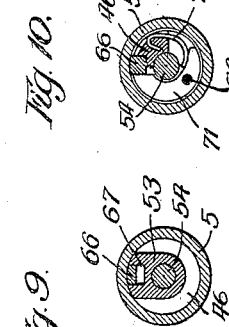
Inventor:
Reinhold A. Norling.
By: Eugene Cowan Atty.

1,434,560

UNITED STATES PATENT OFFICE.

REINHOLD A. NORLING, OF AURORA, ILLINOIS, ASSIGNOR TO INDEPENDENT PNEUMATIC TOOL COMPANY, OF CHICAGO, ILLINOIS, A CORPORATION OF DELAWARE.

SWITCH HANDLE.

Application filed May 28, 1920. Serial No. 384,812.

*To all whom it may concern:*

Be it known that I, REINHOLD A. NORLING, a citizen of the United States, residing at Aurora, in the county of Kane and State of Illinois, have invented new and useful Improvements in Switch Handles, of which the following is a specification.

This invention relates to switch handles particularly adapted for use with portable electrically operated tools, such as drills and the like, and consists in the matters hereinafter described and more particularly pointed out in the appended claims.

In the accompanying drawings—

Fig. 1 is a side elevational view of a switch handle constructed in accordance with my invention and shown attached to the outer casing of a portable electrically operated tool, the switch handle and casing at the point of attachment being shown in section to illustrate the manner in which the casing and handle contacts engage;

Figs. 2 and 3 are cross-sectional views taken on lines 2—2 and 3—3, respectively, of Fig. 1;

Fig. 4 is a longitudinal sectional view of the switch handle and showing the switch contacts separated or open and the actuating trigger in the position it occupies at that time;

Fig. 5 is a cross-sectional view taken on line 5—5 of Fig. 4;

Fig. 6 is a longitudinal sectional view of the switch handle and showing the switch contacts in engagement and the actuating trigger in the position it occupies and is held in at such time;

Fig. 7 is a longitudinal sectional view taken on line 7—7 of Fig. 4;

Fig. 8 is a cross-sectional view taken on line 8—8 of Fig. 4;

Figs. 9 and 10 are cross-sectional views taken on lines 9—9 and 10—10, respectively, of Fig. 7;

Fig. 11 is a cross-sectional view taken on line 11—11 of Fig. 4; and

Fig. 12 is a cross-sectional view taken on line 12—12 of Fig. 6.

In the drawings, 1 indicates the outer casing of a portable electrically operated tool, such as a drill, having a boss 2 at one side and to which my improved switch handle 3 is detachably secured, the handle extending outwardly from one side of the tool casing, as usual in tools of this general type. The handle 3 comprises two parts, a switch casing 4 at the inner end and a tubular handle stem 5 at the opposite end. The switch casing 4 has an end flange 6 at its inner end and a tubular extension 7 at its other end. The flange 6 is detachably secured to the boss 2 by fastening members, such as screws 8, thus permitting the switch handle to be readily removed from and attached to the tool. The switch casing 4 has an opening in one of its walls, and this opening is closed by a removable cover plate 9, thus enabling access to be had into the switch casing for inspection or repair.

The handle stem 5 has an enlarged portion 10 at its inner end to receive the extension 7 of the switch casing. The portion 10 is split longitudinally for a short distance inward and lugs or ears 11 are provided on opposite sides of the line of severance to be engaged by a screw 12 to clamp the handle stem on the extension 7 and to removably connect such parts together. The screw 12 also engages an annular groove 13 in the extension 7, so that by loosening the screw the handle stem 5 may be turned about its longitudinal axis for bringing the actuating trigger of the switch mechanism into convenient position for grasping and holding during the operation of the tool. Thus the position of the trigger may be readily changed by turning the handle stem without turning the tool from its working position. The inner end of the switch casing 4 is closed by a disc or plate 14 of insulating material, as fiber, and held in place by screws 15. Attached to the inner surface of this disc are spring contact fingers 16, 17, arranged in pairs, with the fingers of each pair oppositely disposed, as shown in Figs. 4, 6, and 7. The fingers of each pair are prevented from contacting with each other by an interposed fiber or other insulating bushing 18 on a rod 19 extending across and secured in the switch casing, as shown in Fig. 7. The fingers of each pair are provided at their free ends with opposed contact blocks 20. The disc 14 is provided with two contacts 21, 22 having substantially flat contact surfaces and which surfaces are substantially flush with the outer face of the fastening flange 6. The handle contacts 21, 22 do not project beyond the end of the handle and therefore are not likely to be damaged by exterior objects when the handle is removed from the tool casing. The contact 21 is secured to one of the spring fingers 16, while the other contact 22 is secured to one of the fingers 17, the contacts having screws 23 for such purpose. Each of the other fingers 16, 17 is secured to the disc 14 by a binding screw 24, and to these are attached the respective current conductors 25, 25 contained in a cable 26 leading into the switch casing 4 at one side thereof, as shown in Figs. 1, 4, and 6. The cable is secured to the switch casing by a saddle clamp 27 fastened to the casing by screws 28, thus taking the strain off the binding screws 24. To prevent the cable from kinking at the switch casing and protect it from injury by contact with the handle parts, the cable is wrapped by a coil of wire 29, tightly wound and directing and yieldably holding the cable away from the switch handle.

The boss 2 of the tool is closed by a disc 30 of insulating material secured to the tool casing by screws 31, as shown in Fig. 1. This disc carries two contact members 32, 32, these being at the outer ends of screws 33, which are surrounded by coil springs 34 providing yielding supports for said contacts. The contact surfaces of these contacts 32 are substantially flat and engage the handle contacts 21, 22 when the handle is attached to the tool. Conductor wires 35, 35 are connected with the casing contacts 32, 32 and lead to the motor (not shown) in the tool. The conductor wires 25, 35 being connected to separate and distinct sets of contacts, carried by the tool casing and handle respectively, permits ready disconnection of the handle from the tool casing without disturbing the connection of the wires with their respective contacts. Moreover, the casing contacts 32, 32 being yieldably mounted causes them to bear constantly against the handle contacts 21, 22 when the handle is secured to the tool casing.

Slidably mounted in the extension 7 is a sleeve 36 open at its outer end and closed at its inner end by a head 37. This has a peripheral slot 38 engaged by a guide block 39, held fixed by a screw 40. This block holds the sleeve 36 against rotation. The shoulder at the end of the extension 7 limits the endwise movement of the sleeve 36 in that direction, while an inwardly projecting lug 41 limits the movement of the sleeve in the opposite direction. The head 37 has two extensions 42, 42 projecting toward the spring fingers 16, 17 and one for each pair of fingers. On each extension 42 is a blade 43 secured thereto by screws 44. Each blade projects beyond its extensions and is there provided with contact blocks 45, 45 on opposite sides of the blade and adapted to move between and in engagement with the contact blocks 20 on the associated pair of fingers 16, 17, as shown in Fig. 6. When the parts are thus engaged, the switch contacts are closed and current may flow through conductor wires 25, 35 into the motor of the tool for operating the same. By providing two sets of spring contact fingers 16, 17, there is one set for the positive side of the circuit and a separate set for the negative side, and by cutting both positive and negative sides, when the switch is thrown out, a short circuit would not be produced even though the contact fingers of one set were bridged while the switch is off.

To provide a quick snap make and break between the contacts of the switch mechanism and thus avoid destructive arcing, the following construction is provided. In the handle stem 5 is secured a trigger block 46 slotted longitudinally and into which extends the inner end of the actuating trigger 47 pivoted in the block by a pin 48. The trigger projects out from the handle through an elongated slot 49 therein. Said block 46 is held against rotative as well as endwise movement by a key 50. (See Figs. 6 and 12.) The outer end of the stem 5 is open to permit the switch actuating parts to be inserted into the same, the open end of the stem being removably closed by a tubular shaped cover or cap 51, which also overlaps the key 50 and holds it in place. In the stem 5 beyond the block 46 is an expansion spring 52 connected by a yoke 52$^a$ to the trigger 47 to normally throw and hold it into position with the switch contacts separated or apart, as shown in Figs. 4 and 7. This is the normal position of the parts. The opposite end of the block 46 has a tubular extension 53, in which is slidably mounted one end of a rod 54. The other end of the rod extends through the head 37 of the sleeve 36 and is secured thereto by slotted discs 55, 56 engaging grooves in that end of the rod and on opposite sides of the head. The outer disc 55 is held in place by a cotter pin 57, as shown in Fig. 7. A portion of the rod 54 in the extension 53 is reduced to provide a substantially wide groove forming at its ends shoulders 58 facing each other, while the rod toward the sleeve 36 is enlarged, as at 59, the latter providing at its ends oppositely facing shoulders 60, 61. Capable of a short, endwise movement on the rod 54 toward and away from said shoulders 60, 61 are annular collars 62, 63, between which extends a contractile coiled spring 64, one end secured to one collar and the other end secured to the other collar, the spring surrounding said enlarged portion 59, as shown in Figs. 4 and 6.

Surrounding the spring 64 is a sleeve 65 having a length shorter than the distance between the collars 62, 63 and in the path of movement of said collars. Fixed to the sleeve 65 and extending toward the trigger 47 is a bar 66. This has sliding bearing in a groove 67 in the extension 53, as shown in Fig. 8. Said bar 66 is connected by a link 68 with the trigger 47, as shown. Said bar 66 is cut away between its ends to provide oppositely inclined cam faces 69, 70, which in the endwise movement of said bar engage and actuate a pawl 71 located in a transverse recess 72 in the trigger block 46, as shown in Figs. 6, 7, and 10. This pawl, which is arcuate in shape as shown in Fig. 10, is pivoted to the block 46 by a pin 73. The pawl 71 has swinging movement at right angles to the rod 54, and a spring 74 (Fig. 10) serves to normally hold the pawl in the path of the cam surfaces 69, 70. To co-operate with these surfaces, the free end of the pawl has converging inclined surfaces 75, 76. When the switch contacts are engaged, as shown in Fig. 6, the body of the pawl extends across the end of rod 54 to hold it in that position, while when the switch contacts are separated, as shown in Fig. 4, the pawl extends into the groove between the shoulders 58 and holds the rod in that position. The action of the cams 69, 70 on the pawl swings it clear of the rod to release it, and permits the action of the spring 64 in a manner to be presently described.

The structure shown and described operates as follows: When the parts occupy the positions shown in Fig. 4, the switch contacts 16, 17 and 43 are separated or open and no current flows to the motor of the tool when the switch handle is secured thereto, the trigger 47 at this time being in its normal position, that is, directed toward the outer end of the handle stem and in position to be grasped by the hand of the operator and swung toward the inner end of the handle for moving the switch contacts into engagement and cutting in the current to the motor of the tool. The trigger is held in normal position by the spring 52 and the spring 64 holds the switch contacts apart or open. The rod 54 is held against accidental endwise movement by the pawl 71 engaging the shoulders 58, while the collars 62, 63 are held against the shoulders 60, 61 by said contractile spring 64. To move the switch contacts into engagement for cutting in the current to the motor of the tool, the trigger 47 is engaged by the thumb or hand of the operator and swung toward the inner end of the handle. As the trigger is being swung in this direction, the bar 66 is moved in the same direction and the sleeve 65 is carried therewith. As said sleeve moves inward, it pushes the collar 62 inward on the rod 54, which is held stationary by the pawl 71, and expands or stretches the spring 64, due to the fact that the other collar 63 is held stationary against the shoulder 61 on the rod 54. This operation stores up power in the spring 64, and as soon as the cam 70 on the bar 66 acts on the pawl 71, the latter is swung outward and releases the rod 54 and permits the spring 64 to impart a quick snap movement to the rod and move the contact blades 43 carried thereby into engagement with the contact fingers 16, 17 and cut in current to the motor of the tool. Movement of the rod 54 in this direction is arrested by contact of the head 37 with the stop lug 41 on the guide block 39, as shown in Fig. 6, and thus the rod contacts are prevented from moving beyond the fixed contact members 16, 17. The spring 52 acts constantly to return the trigger 47 to its normal or starting position, as shown in Figs. 4 and 7, and consequently the operator must retain his hand on the trigger and hold it in position with the switch contacts engaged, in order to supply the motor of the tool with current; otherwise, as soon as the trigger is released, it will be returned to its starting position and cause the switch contacts to be separated and the current to the tool cut off. This is an advantageous feature as it provides a safety device and cuts out the switch the moment the trigger is released, thus stopping the motor of the tool and preventing it from injury and damage being done when the tool is not to be used. As the trigger moves to normal position, the bar 66 is pulled with it, but no movement is imparted to the rod 54 as the pawl 71 extending across the outer end of the rod holds it stationary. The sleeve 65 is moved, however, away from the collar 62 and into contact with the other collar 63. When this happens, a continued movement of the sleeve 65 moves the collar 63 away from the shoulder 61 and expands or stretches the spring 64, whereupon the other collar 62 is brought into engagement with its shoulder 60 and a continued expansion of the spring 64 stores up power in the spring and exerts a pressure on the rod 54 to move it toward the trigger 47. Just before the trigger reaches its starting position, the cam 69 engages the pawl 71 and swings it away from the rod 54, permitting the spring 64 to impart a quick movement thereto and break the switch contacts by a quick snap action and thus reduce arcing to the minimum.

To render impossible arcing across the fixed contacts 16, 17 and to protect them from such arcing as might occur, I place between them a sheet or layer 77 of asbestos or equivalent material and also line the walls of the switch casing 4 with like layers 78, 78. As shown in Fig. 8, the blades 43 are insulated from the extensions 42 and screws 44 and the clamp plates 79 by interposed layers of insulating material.

The construction described and shown has many advantages, among which are the following. A quick make and break between the switch contacts is provided for, and this is accomplished by storing up power in the spring 64 before the actuating trigger 47 reaches its final position in either direction. Thus arcing between the switch contacts upon their separation is reduced to the minimum. The main lead wires 25, 25 are carried by the handle and are connected with the respective handle contacts 21, 22, while the wires 35 to the motor of the tool are connected with the respective casing contacts 32, 32, and as the casing and handle contacts have surface engagement, the switch handle may be removed from and attached to the tool casing without disturbing the conductor wires attached to said contacts or being required to connect and disconnect these wires from their contacts upon removing the handle from or attaching the same to the tool casing. The switch handle being detachably connected with the tool casing permits the handle to be made and assembled as a unit separate and distinct from the tool and be handled as such during the manufacture and repair thereof. The switch is either fully opened or fully closed, so that there is no possibility of the switch contacts remaining in arcing position, and further the positive and negative contacts being broken simultaneously, the possibility of short-circuiting through the handle contacts is prevented, as neither the negative nor positive side of the circuit is left closed when the switch is open. The switch being automatically cut out as soon as the trigger is released provides an automatically operating device, and provides a safety feature in that the motor of the tool will stop and prevent damage to its parts or to objects with which it may be brought in contact when the tool is not held in position for use. This also effects a saving in electric current, as the tool will stop without the operator being required to turn off the switch. The wire coil 29 being tightly wound holds the cable 26 away from the handle and prevents it from interfering with the actuation of the trigger. Other and further advantages will appear to those skilled in the art to which my invention relates.

While I have described and shown in detail herein a switch handle of my invention, it is to be of course understood that the details of construction and arrangement of parts may be variously changed and modified without departing from the spirit and scope of my invention.

I claim as my invention:

1. The combination with a portable electrically operated tool having a casing provided with positive and negative contacts, of a switch handle adapted to be detachably connected with said tool casing and provided with positive and negative contacts to engage the casing contacts upon attaching the handle to the tool casing, electric conductors attached to respective contacts and carried by the tool casing and handle, respectively, to permit the handle to be removed from and attached to the tool casing without disconnecting the conductors from the contacts, and a switch mechanism carried by said handle for making and breaking the circuit through both the positive and the negative handle and casing contacts.

2. The combination with a portable electrically operated tool having a casing provided with positive and negative contacts, of a switch handle adapted to be detachably connected with the tool casing and having positive and negative contacts to engage the casing contacts upon attaching the handle to the tool casing, one set of positive and negative contacts being yieldably mounted and both sets having substantially flat contacting surfaces, electric conductors attached to respective contacts and carried by the tool casing and handle, respectively, to permit the handle to be removed from and attached to the tool casing without disconnecting the conductors from the contacts, and a switch mechanism carried by said handle for making and breaking the circuit through both the positive and the negative handle and casing contacts.

3. The combination with a portable electrically operated tool having a casing provided with an attaching boss at one side thereof, of a disc secured in said boss, a set of positive and negative contacts yieldably carried by said disc and having their contact surfaces substantially flat and on the outside of said disc, a switch handle adapted to be detachably connected at its inner end to said boss, a disc secured in the inner end of said handle, a set of positive and negative contacts carried by said handle disc and having substantially flat contact surfaces to engage the casing contacts upon attaching the handle to said boss, electric conductors attached to the respective contacts and carried by the tool casing and handle, respectively, to permit the handle to be removed from and attached to the tool casing without disconnecting the conductors from said contacts, and a switch mechanism carried by said handle for making and breaking the circuit through said casing and handle contacts.

4. The combination with a portable electrically operated tool, of a switch handle comprising a switch casing and a stem, the former adapted to be secured to the tool casing, a switch mechanism in said switch casing, a trigger in the stem, means connecting the switch casing and stem together in a manner permitting the stem to be turned with respect to the switch casing for bringing the trigger in convenient position for grasping and holding during the operation of the tool, and means in the stem and rotative therewith for connecting the switch mechanism and the trigger together.

5. The combination with a portable electrically operated tool, of a switch handle comprising a switch casing and a stem, the former adapted to be secured to the tool casing, a switch mechanism in the switch casing, a trigger in the stem, said switch casing having a tubular extension engaged by the inner end of the stem, the inner end of said stem being split longitudinally and provided with opposed ears, a fastening member engaging said ears for clamping the stem on said extension and the latter having an annular groove engaged by said fastening member permitting the stem to be turned about said extension, and means in the stem for connecting the switch mechanism and the trigger together.

6. A switch handle, comprising a switch casing having positive and negative contacts, a switch mechanism in said switch casing and having two pairs of spring contact fingers, one finger of each pair being connected with the associated handle contacts, current conductors leading into the switch casing and connected with the other contact fingers, switch blades, one for each pair of contact fingers and adapted to be moved simultaneously into and out of bridging engagement therewith, said handle having a stem connected with the switch casing, a trigger in said stem, and means connecting the blades and the trigger together for moving the blades into and out of contact with the contact fingers upon actuation of the trigger.

7. A switch handle, comprising a switch casing and a stem, fixed contacts in the switch casing at the inner end of the handle, contact members movable into and out of engagement with the fixed contact members, a pivotally mounted trigger in the stem adjacent the forward end of the handle, and means connecting the movable contact members with the trigger, including mechanism located in the stem between the trigger and the movable contact members for storing up power during a part of the movement of the trigger and capable of being released at the end of the movement of the trigger to impart a quick snap movement to the movable contact members.

8. A switch handle, comprising a switch casing and a stem, fixed contacts in the switch casing, contact members movable into and out of engagement with the fixed contact members, a pivotally mounted trigger in the stem, means connecting the movable contact members with the trigger, including mechanism located in the stem between the trigger and the movable contact members for storing up power during a part of the movement of the trigger and capable of being released at the end of the movement of the trigger to impart a quick snap movement to the movable contact members, and means for automatically returning the trigger to its normal position after being released.

9. A switch handle, comprising a switch casing and a stem, fixed contact members in said switch casing, an endwise movable rod in said stem, contact members carried by said rod and movable therewith into and out of engagement with said fixed contact members, a pivotally mounted trigger in said stem, means for holding said rod against endwise movement during a part of the movement of said trigger and releasing the rod at the end of the movement of said trigger, and means connecting said rod with said trigger including a spring surrounding said rod and acting thereon to impart a quick endwise movement to said rod when the latter is released at the end of the movement of said trigger.

10. A switch handle, comprising a switch casing and a stem, fixed contact members in said switch casing, an endwise movable rod in said stem, contact members carried by said rod and movable therewith into and out of engagement with said fixed contact members, a pivotally mounted trigger in said stem, a contractile spring surrounding said rod and acting thereon for imparting endwise movement to said rod, means for holding said rod against movement during a part of the movement of said trigger and releasing said rod at the end of the movement of said trigger, and means movable by said trigger for expanding said spring for moving said rod when released.

11. A switch handle, comprising a switch casing and a stem, fixed contact members in said switch casing, an endwise movable rod in said stem, contact members carried by said rod and movable therewith into and out of engagement with said fixed contact members, a pivotally mounted trigger in said stem, a contractile spring for imparting endwise movement to said rod, means for holding said rod against movement during a part of the movement of said trigger and releasing said rod at the end of the movement of said trigger, collars on said rod and connected with the ends of said spring and acting against shoulders on said rod for moving the same endwise, and means movable by said trigger for expanding said spring for moving said rod when released.

12. A switch handle, comprising a switch casing and a stem, fixed contact members in said switch casing, an endwise movable rod in said stem, contact members carried by said rod and movable therewith into and out of engagement with said fixed contact members, a pivotally mounted trigger in said stem, a contractile spring for imparting endwise movement to said rod, means for holding said rod against movement during a part of the movement of said trigger and releasing said rod at the end of the movement of said trigger, collars on said rod and connected with the ends of said spring and acting against shoulders on said rod for moving the same endwise, a sleeve surrounding said spring between said collars and movable by said trigger into engagement with said collars for expanding said spring and for moving said rod when released.

13. A switch handle, comprising a switch casing and a stem, fixed contact members in said switch casing, an endwise movable rod in said stem, contact members carried by said rod and movable therewith into and out of engagement with said fixed contact members, a pivotally mounted trigger in said stem, a contractile spring surrounding said rod for imparting endwise movement to said rod, a spring pressed pawl pivoted in said stem between the trigger and said spring and adapted to engage said rod for holding the same against endwise movement during a part of the movement of said trigger, means movable by said trigger for expanding said spring, and means operable at the end of the movement of said trigger for withdrawing said pawl out of engagement with said rod to permit said spring to move said rod.

14. A switch handle, comprising a switch casing and a stem, fixed contact members in said switch casing, an endwise movable rod in said stem, contact members carried by said rod and movable therewith into and out of engagement with said fixed contact members, a pivotally mounted trigger in said stem, a contractile spring surrounding said rod for imparting endwise movement to said rod, a spring pressed pawl pivoted in said stem between the trigger and said spring and adapted to engage said rod for holding the same against endwise movement during a part of the movement of said trigger, and means including a bar for expanding said spring upon the movement of said trigger, and said bar and pawl having co-operative parts to withdraw the pawl from engagement with said rod at the end of the movement of said trigger to permit said spring to move said rod.

15. A switch handle, comprising a switch casing and a stem, fixed contact members in said switch casing, an endwise movable rod in said stem, contact members carried by said rod and movable therewith into and out of engagement with said fixed contact members, a pivotally mounted trigger in said stem, a contractile spring surrounding said rod and acting thereon for imparting endwise movement to said rod, means for holding said rod against movement during a part of the movement of said trigger and releasing said rod at the end of the movement of said trigger, means movable by said trigger for expanding said spring for moving said rod when released, and a spring for returning said trigger to its normal position when released.

16. A switch handle, comprising a switch casing and a stem, fixed contact members in said switch casing, an endwise movable rod, contact members carried by said rod and movable therewith into and out of engagement with said fixed contact members, a pivoted trigger in said stem, a contractile spring surrounding said rod for imparting endwise movement to said rod, a pivoted pawl in said stem between the trigger and said spring and adapted to engage said rod for holding the same against movement during a part of the movement of said trigger, means including a bar movable by said trigger for expanding said spring, said bar and pawl having coacting parts to withdraw said pawl out of engagement with said rod for releasing the same at the end of the movement of said trigger to permit said spring to move said rod, and stop means for limiting the movement of said rod.

17. A switch handle, comprising a switch casing and a stem, fixed contact members in said switch casing, a sleeve slidably mounted in said switch casing and provided with contact members movable with said sleeve into and out of engagement with said fixed contact members, a rod secured to said sleeve and provided with oppositely facing shoulders, a contractile spring surrounding said rod, collars on said rod on opposite sides of said shoulders and connected with said spring, a pivoted pawl in said stem and movable into and out of engagement with said rod for holding the same against movement during a part of the movement of said trigger, a sleeve surrounding said spring between said collars and movable into and out of engagement therewith, a bar connected with said second sleeve, a link connecting said bar and trigger together, said pawl and bar having coacting inclined surfaces to move said pawl out of engagement with said rod at the end of the movement of said trigger, and a spring connected with said trigger for returning the same to its normal position when released.

18. A switch handle, comprising a switch casing and a stem, a set of spring contact fingers in said casing, a sleeve slidably mounted in said switch casing and provided with blades with contact blocks movable with the sleeve into and out of engagement with said fingers, an endwise movable rod secured to said sleeve and provided with oppositely facing shoulders, a contractile spring surrounding said rod, collars on said rod on opposite sides of said shoulders and movable into and out of contact therewith and connected with said spring, a sleeve surrounding said spring between said collars and movable into and out of contact therewith, a trigger pivoted to said stem, a spring pressed pawl pivoted in said stem adjacent the end of said rod and movable into engagement with said rod for holding the same against movement during a part of the movement of said trigger, an endwise movable bar connected with said second sleeve, a link connecting the bar and trigger together, and a spring on the opposite side of said trigger and connected therewith, said bar having cam faces to act on said pawl for moving the same out of contact with said rod.

19. A switch handle, comprising a switch casing and a stem, a switch mechanism in said casing and having fixed and movable contact members, a pivoted trigger in said stem, means connecting said switch mechanism and trigger together for enabling the contact members to be moved into and out of engagement with each other upon the catuation of the switch mechanism by said trigger, and a cable extending into said switch casing from one side thereof and having conductor wires connected with the respective fixed contact members, and a wire coil tightly wound about the portion of said cable entering said switch casing, and holding the portion of said cable adjacent said casing curved directly outward and away from the same.

In testimony that I claim the foregoing as my invention, I affix my signature this 25th day of May, A. D. 1920.

REINHOLD A. NORLING.